US012153596B1

(12) United States Patent
Shivarathri (10) Patent No.: US 12,153,596 B1
(45) Date of Patent: Nov. 26, 2024

(54) PROCESSING DATA IN A SYSTEM THAT IS DYNAMICALLY CONFIGURED BASED ON THE DATA CONTEXT

(71) Applicant: T-Mobile USA, Inc., Bellevue, WA (US)

(72) Inventor: Giri babu Shivarathri, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 156 days.

(21) Appl. No.: 17/326,207

(22) Filed: May 20, 2021

Related U.S. Application Data (63) Continuation-in-part of application No. 17/109,036, filed on Dec. 1, 2020, now abandoned.

(51) Int. Cl.
*G06F 16/25* (2019.01)
*G06F 16/215* (2019.01)
*G06N 20/00* (2019.01)

(52) U.S. Cl.
CPC .......... *G06F 16/254* (2019.01); *G06F 16/215* (2019.01); *G06F 16/258* (2019.01); *G06N 20/00* (2019.01)

(58) Field of Classification Search
CPC ...... G06F 16/254; G06F 16/215; G06N 20/00
See application file for complete search history.

(56) References Cited

U.S. PATENT DOCUMENTS

| | | | |
|---|---|---|---|
| 9,489,397 B1 * | 11/2016 | Olson | G06Q 40/08 |
| 10,241,992 B1 * | 3/2019 | Middendorf | G06V 30/412 |
| 10,614,056 B2 * | 4/2020 | Ignatyev | G06F 16/215 |
| 11,100,373 B1 * | 8/2021 | Crosby | G16H 30/40 |
| 11,232,121 B2 * | 1/2022 | Moskovich | G06F 16/254 |
| 2018/0314705 A1 * | 11/2018 | Griffith | G06F 16/185 |

* cited by examiner

*Primary Examiner* — Charles D Adams
(74) *Attorney, Agent, or Firm* — Foley IP Law, PLLC (57) ABSTRACT

The disclosure herein describes a data processing system that enhances its performance based on context of the data to be processed. An input data set is obtained, and a context of the data set is identified based on context metadata. Anomalous data of the data set is identified, and a correction model is applied to the anomalous data to generate corrected data based on the identified context. The data of the input data set, including the corrected data, is extracted to a landing data store. A transformation process of the extracted data is optimized based on the identified context and the optimized transformation process is performed on the extracted data to generate transformed data. The transformed data is loaded into a target data store. The described system is configured to handle anomalous data and optimize transformation processes automatically, which enhances the efficiency and flexibility of the system.

20 Claims, 5 Drawing Sheets

PROCESSING DATA IN A SYSTEM THAT IS DYNAMICALLY CONFIGURED BASED ON THE DATA CONTEXT

CROSS-REFERENCE TO RELATED APPLICATION

This application is a continuation-in-part application of and claims priority to U.S. patent application Ser. No. 17/109,036, entitled "SYSTEMS AND METHODS OF AUTOMATING DATA PROCESSING AND MOVEMENT," filed on Dec. 1, 2020, the disclosure of which is incorporated herein by reference in its entirety.

BACKGROUND

Data processing systems, such as extract transform load (ETL) systems, are generally used to copy data from one or more sources into a destination system which represents the data differently from the sources and/or in a different context than the sources. Use of data processing systems has become increasingly popular and is often used in data warehousing. However, in many cases, identifying and correcting errors or other anomalies in incoming data is a largely manual process that requires significant time and effort in large or complex systems. Further, in such large data processing systems that must process significant quantities of diverse data sets, ensuring efficient extraction and transformation data in a timely manner presents substantial challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Aspects of the disclosure enhance performance of a data processing system based on context of data to be processed at least by obtaining, by a processor of the system, an input data set at an extraction layer; identifying, by the processor, a context of the input data set based on context metadata of the input data set; identifying, by the processor, anomalous data in the input data set based on the identified context; applying, by the processor, a correction model to the anomalous data, wherein the correction model is configured to perform a correction operation on the anomalous data based on the identified context to generate corrected data; extracting, by the processor, data of the input data set to a landing data store, wherein the extracted data includes data associated with the corrected data; optimizing, by the processor, a transformation process of the extracted data based on the identified context; performing, by the processor, at a transformation layer, the optimized transformation process on the extracted data based on the identified context to generate transformed data; and loading, by the processor, the transformed data into a target data store.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Systems and methods for processing data in a data processing system, such as an ETL system, that is dynamically configured based on context of the data to be processed are described. The system "self-configures" based on the context of an incoming data set, such that the processing of the intake of the data is a flexible, automated process and the processing of the data is performed efficiently. The system is configured to use context metadata (e.g., names of data files and data fields within those files, structures of the data, types of data values) from the input data set to identify and correct anomalous data in the data set, such that errors present in the data set may be automatically corrected without manual intervention, enabling the extraction of the data to be performed smoothly. A correction model, trained using machine learning techniques and past correction data as training data, may be used to perform such corrections of anomalous data. The context metadata is further used to optimize the performance of a specified transformation process on the extracted data. The end goal of the transformed data is largely the same, regardless of the original source of the data, but each input data set may have widely varying features, as reflected in the context data, such that the same transformation operations may not be necessary for each input data set. An optimizer engine may adjust the operations to be performed, the arrangement and/or partitioning of data during the transformation process, and/or the resources used for the transformation process to enhance the efficiency and performance thereof.

The described systems and methods enable the use of a dynamically self-configuring data processing system to process data efficiently based on the context of the data. An input data set is obtained, and a context of the data set is identified based on context metadata (e.g., a context of the data set may include types and subtypes of the data entries, classifications of data and/or limitations of those classifications, relationships between data entries, such as parent-child relationships, or the like). Anomalous data of the data set is identified, and a correction model is applied to the anomalous data to generate corrected data based on the identified context. The data of the input data set, including the corrected data, is extracted to a landing data store. A transformation process of the extracted data is optimized based on the identified context and the optimized transformation process is performed on the extracted data to generate transformed data. The transformed data is loaded into a target data store.

The described systems and methods provide intelligent, efficient processing of data via a data processing system, such as an ETL system, that operates in an unconventional manner by using context metadata of the data to be processed to customize the configuration of the system prior to and during the processing. The use of a trained model for identifying anomalous data and/or correcting anomalous data enables the system to be flexible in what types and/or formats of data it is configured to receive and to automatically respond to detected issues with the data, avoiding manual review which may impede the data processing. The described model operates on any input data set, so long as it has been trained using past correction data associated with similar data sets (e.g., data sets from the same data source). Further, the context metadata of the input data set is leveraged in a second way to determine optimizations of the transformation process prior to and/or during the performance of the process. The context metadata may be used to identify redundant or otherwise unnecessary operations and eliminate them, to identify ways that data can be batched, partitioned, or arranged on temporary data tables to ensure efficient use of some operations that maybe resource-heavy, and to organize resource usage of the transformation process in a manner that is specific to the processing of the current input data set (e.g., ensuring that the temporary data storage assigned to the process is large enough to reduce or prevent repeated iterations of the process across a large data set). The use of the context of the data for these dynamic system configurations reduces requirements of manual intervention in the operation of the system, enhances the rate at which the system processes data, enhances the flexibility of the system's capability to process diverse sets of data, and reduces inefficiencies in hardware resource usage by the system.

Figure 1:
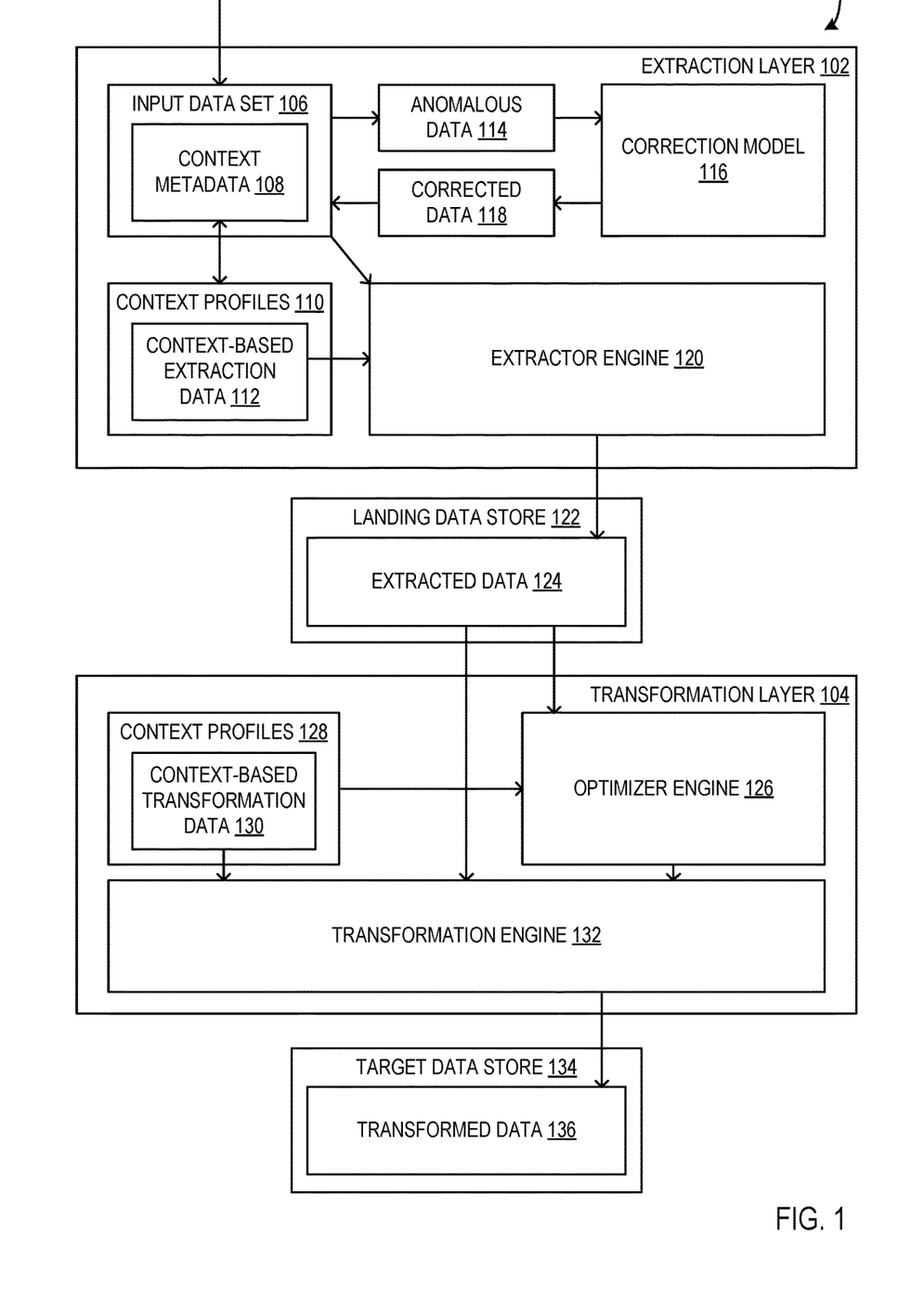
FIG. 1 is a block diagram illustrating a data processing system for processing input data according to an embodiment.

FIG. 1 is a block diagram illustrating a data processing system 100 for processing input data (e.g., input data set 106) according to an embodiment. The system 100, which may include or comprise an ETL system in some examples, includes an extraction layer 102, a transformation layer 104, a landing data store 122 that operates as temporary data storage for data between the layers 102 and 104, and a target data store 134 that operates as the destination for the data being processed by the system 100. In some examples, the system 100 is located on and/or executed on a single computing device. Alternatively, in other examples, the system 100 is located and/or executed on multiple computing devices, such as a distributed network of computing devices. Further, each layer (e.g., layers 102 and/or 104) of the system 100 may be located and/or executed on a single computing device or on multiple computing devices, such as distributed networks of computing devices. For instance, the extraction layer 102 may be executed on a first computing device while the transformation layer 104 may be executed on a second computing device.

Further, while examples herein describe the extraction, transformation, and loading of a single set of data such as input data set 106, in some examples, the system 100 is configured to process multiple sets of data in series and/or parallel. For instance, the extraction layer 102 may be configured to perform extraction operations on a first set of data while the transformation layer 104 is configured to perform transformation operations on a second set of data at the same time (wherein the second set of data has already been extracted by the extraction layer 102 previously). Further, the layers 102 and 104 may be configured to perform their associated operations on multiple sets of data in series and/or in parallel. For instance, the system 100 may be configured to handle multiple streams of input data from one or more data sources (e.g., three streams, five streams, ten streams), such that the extraction layer 102 is configured to perform extraction operations on input data sets from each of the streams at substantially the same time and the transformation layer 104 is configured to perform transformation operations on extracted data associated with each of the streams at substantially the same time. As a result, data from each stream may be processed substantially in parallel by the system 100. It should be understood that the system 100 may be configured to process data in different ways without departing from the description herein (e.g., as a data processing system other than an ETL system).

In some examples, the extraction layer 102 is configured to receive and/or otherwise obtain input data sets 106 via an input data interface. Input data sets 106 may be obtained from various data sources, such as customers or other entities that have been provided access to the system 100. Alternatively, or additionally, the system 100 may include a buffer data store in which input data sets 106 are stored prior to processing and from which the extraction layer 102 obtains the input data sets 106 based on the configuration of the extraction layer 102 (e.g., based on a defined rate of data processing). The input data set 106 includes payload data to be extracted and/or transformed and context metadata 108. The payload data of the input data set 106 may include data of various types (e.g., string data, integer data values) arranged in various formats (e.g., data in spreadsheet files, data in a comma separated value format, data in index-value tuples, or the like). The context metadata 108 includes data associated with the labeling, organization, or other aspects of the input data set 106, such as types of data entries, classifications of data entries, and/or relationships between data entries in the data set. For instance, the context metadata 108 may include the name and/or naming convention of a file of the input data set 106, the labels of columns and/or fields associated with the data set, and/or the types of data included in the data set, the quantity of columns or fields included in the data set, or the like.

In some examples, the context metadata 108 includes metadata that describes all aspects of a data set at a detailed level. The specification of the context metadata 108 may be at a data set level and/or an individual column/attribute level. When such context metadata 108 is maintained in machine readable format, it enables advanced intelligence to be embedded in the data processing mechanisms and make use of the metadata 108. Some example aspects of the context metadata 108 include: indicators that a data set is a start point of a business process (e.g., a prepaid sales order data set); indicators that the data set extends an existing data context (e.g., a sales order line which extends a sales order context); a granularity and/or primary key of the data set; connections or relationships between a data set and other data and cardinality data associated with the relationships; indicators of whether a data set is a mandatory extension of another data context in a business process; a data flow pattern (e.g., versions or states of a sales transaction throughout its lifecycles from being placed to fulfillment, refund, or the like); indicators of whether the data set is aggregated; indicators of context restrictions (e.g., a given data set is only for voucher sales through a call center); a source or sources of the data set; structures of the data set in terms of attributes along with descriptions and/or purposes of each attribute; and/or relationships between attributes and/or columns of a data set with other data sets or attributes/columns thereof.

The extraction layer 102 may be configured to use the context metadata 108 to associate the input data set 106 with a context profile 110 that may be used to inform how the extraction of the data is to be performed, among other things. In some examples, the extraction layer 102 compares or otherwise matches the context metadata 108 of the input data set 106 to one of the context profiles 110 for within which the extraction layer 102 is compatible. Each of the context profiles 110 may be associated with a set of metadata patterns that can be compared to the context metadata 108 of incoming input data sets 106. An input data set 106 may be associated with a context profile 110 based on the associated context metadata 108 matching with a metadata pattern of the context profile 110 exactly. For instance, if a context profile 110 includes a metadata pattern that includes three data fields named field A, field B, and field C, an input data set 106 may be matched to the context profile 110 if the context metadata 108 thereof includes exactly those three data fields. Additionally, or alternatively, an input data set 106 may be associated with a context profile 110 based on the context metadata 108 matching to a metadata pattern of the context profile 110 in a non-exact manner. For instance, an input data set 106 may be associated with the three-field context profile 110 described above based on the context metadata 108 of the input data set 106 including the three expected data fields and a fourth data field and/or based on the context metadata 108 of an input data set 106 including three similar data fields but where one of the data fields is named differently. In some examples, such non-exact matching used to associate input data sets with context profiles may be based on identifying context profiles that "fit" the context metadata 108 of the input data set 106 the best or the closest (e.g., matching an input data set 106 to a context profile 110 that has the most similar metadata patterns to the context metadata 108). Such a matching process may include comparison of the context metadata 108 of the input data set 106 to all the context profiles 110 to identify the best fit.

Additionally, or alternatively, the context metadata 108 of the input data set 106 may be configured to include an indicator that uniquely identifies the context profile 110 with which the input data set 106 should be associated. For instance, if all the input data sets 106 from a particular data source should be associated with a particular context profile 110, data indicating the data source of the input data set may be used as an indicator of the context profile 110 with which the input data set should be associated.

In some examples, the extraction layer 102 is configured to identify anomalous data 114 in the input data set 106 and to apply a correction model 116. Identification of the anomalous data 114 may be performed on the input data set 106 based on the context metadata 108 and/or the associated context profile 110 of the input data set 106. For instance, if a data value in the data set 106 is a string type and the context metadata 108 and/or context profile 110 indicates that the data value is expected to be an integer type, the data value may be determined to be anomalous data 114. Anomalous data 114 may also include values missing from the data set 106 that should be present, extra data values that are not expected to be present, data values that are outside of expected ranges, anomalous file type of the file or files of the input data set 106, or the like. Further, anomalous data 114 may include anomalies such as metadata values that are unexpected (e.g., typos in metadata labels or field names of the data set) or otherwise found to be incorrect (e.g., a metadata value that incorrectly indicates a quantity of data records present in the data set). Other types of anomalous data 114 may also be identified by the extraction layer 102 without departing from the description herein.

In some examples, the correction model 116 is configured as a model that receives anomalous data 114 as input, performs one or more corrective operations on the anomalous data 114, and outputs the corrected data 118 to the input data set 106 as output. Alternatively, the correction model 116 may be configured to receive the input data set 106, identify the anomalous data 114 as described above, and output corrected data 118 to the input data set 106 as output. The correction model 116 may be configured to determine which corrective operations to perform based on the anomalous data 114 itself and/or based on the context metadata 108 and associated context profile 110 of the input data set 106. For instance, if the identified anomalous data 114 includes a data value that is of the wrong type (e.g., an integer data value instead of a string data value), the correction model 116 may be configured to determine that the data value should be converted to a string data value based on the context metadata 108 of the input data set 106 indicating that the data value should be a string. Other corrective operations performed by the correction model 116 may include removing white space from a data entry, removing empty data entries from the input data set, adjusting the significant figures of a data entry to meet requirements of data set 106 and/or context profile 110 associated therewith, or the like.

Further, in some examples, the correction model 116 is a model that is trained using machine learning techniques. The correction model 116 may be trained using data that indicates manual corrective actions taken to correct anomalous data in past input data sets. Such training data may include data indicative of anomalous data (e.g., a type of anomaly identified in the anomalous data) mapped to data indicative of the corrective action(s) taken to correct the anomalous data. Further, the training data may include indications of the context metadata of the associated input data set and/or indications of the context profile 110 with which the input data set is associated (e.g., corrective actions may differ depending on the type and/or context of the input data set). The training data may be provided to the correction model 116 to train the correction model 116 to identify corrective actions to be taken when receiving the anomalous data 114.

In some examples, the training of the correction model 116 includes machine learning techniques that use, for instance, a trained regressor such as a random decision forest, a directed acyclic graph, a support vector machine, a convolutional neural network or other neural network, or another trained regressor. It should further be understood that the training of the model 116 may make use of training data pairs based on data indicative of manual corrections made to anomalous data 114 when applying machine learning techniques and/or algorithms. Millions of training data pairs may be stored in a machine learning data structure of the system 100 for use in training the correction model 116. In some examples, a training data pair includes a timestamp-based anomalous data entry paired with a corrective action indicator indicating one or more operations or other actions to be taken to correct the anomalous data entry. The pairing of the two values demonstrates a relationship between the anomalous data entry and the actions taken to correct it that may be used during the machine learning techniques and/or algorithms. As described above, the anomalous data entry data may also indicate a type of anomaly, a type of data entry, and/or other context metadata specific to the data entry and/or associated with the input data set from which the data entry is taken.

In addition to training the correction model 116 based on manual actions taken to correct anomalous data, the system 100 may be configured to enable the auditing or reviewing of the performance of the correction model 116 as it operates to improve its performance. For instance, a user may periodically review a subset of correction decisions made by the correction model 116 and, for each correction decision, confirm that it was correct or that it was in error. The decisions that are confirmed correct may be used as training data for the correction model 116 to reinforce its accurate operations and/or the decisions found to be in error may be used as training data for the correction model 116 to identify and address inaccurate operations and/or performance. Additionally, or alternatively, the system 100 may be configured to identify failures or errors in other portions of the system 100 that may indicate an error in the performance of the correction model 116 and to use that information to further adjust the correction model 116 according to machine learning techniques. For instance, if the correction model 116 corrects anomalous data 114 inaccurately such that a later step fails (e.g., the corrected data 118 cannot be extracted correctly by the extractor engine 120 or it cannot be transformed correctly by the transformation engine 132), that inaccurate performance of the correction model 116 may be flagged for review and/or automatically used as additional training data to improve the accuracy and performance of the correction model 116.

In some examples, the input data set 106 is populated with the corrected data 118 to overwrite or otherwise replace the anomalous data 114 and the extractor engine 120 is configured to extract the data of the input data set 106 into extracted data 124. The extractor engine 120 is configured to perform extraction operations on the input data set 106 based on the context profile 110 with which the input data set 106 is associated, such that the operation of the extractor engine 120 is based, at least in part, on the context-based extraction data 112 (e.g., an extraction library specific to the context) of that context profile 110. For instance, an input data set 106 from a first source may be associated with a first context profile 110 and may be extracted by the extractor engine 120 using a first extractor operation while an input data set 106 from a second source that is associated with a second context profile may be extracted by the extractor engine 120 using a second extractor operation based on the context-based extraction data 112 of the second context profile, wherein the second extractor operation is different from the first extractor operation. In an example, a first extractor operation may be configured to organize unstructured data in the input data set 106 into a data structure that includes rows of associated data entries, while a second extractor operation may be configured to convert loosely structured input data into structured data objects. In other examples, more, fewer, or different types of extraction operations may be used by the extractor engine 120 and based on context-based extraction data 112 of context profiles 110 to extract input data sets 106 into extracted data 124 without departing from the description herein. Further in most examples, the extraction operations of the extractor engine 120 are performed on the corrected data 118 as provided by the correction model 116, rather than any identified anomalous data 114.

The extractor engine 120 is further configured to load, store, or otherwise put the extracted data 124 in the landing data store 122 where it is made available for processing by the transformation layer 104. The landing data store 122 may be configured to store extracted data 124 associated with multiple input data sets 106 from the same data source and/or from different data sources, while also storing the extracted data 124 over various periods of time prior to the data being processed by the transformation layer 104. As a result, the extraction layer 102 is configured to continue performing extraction operations as described herein on other input data sets 106 while the extracted data 124 of an input data set 106 waits to be processed in the landing data store 122, such that the operation of the extraction layer 102 does not require that the transformation layer 104 process or otherwise remove the extracted data 124 from the landing data store 122 before proceeding.

The transformation layer 104 is configured to receive or otherwise obtain the extracted data 124 from the landing data store 122, to perform transformation operations on the extracted data 124 to form transformed data 136 and to load the transformed data 136 into the target data store 134. In some examples, the transformation layer 104 is configured to optimize the transformation of the extracted data 124 using an optimizer engine 126. Such optimizations may be based on the extracted data 124 and/or on context-based transformation data 130 associated with a context profile 128 of the extracted data 124. In some examples, the context profile 128 with which the extracted data 124 is associated may be the same context profile 110 with which the input data set 106, from which the extracted data 124 was extracted, was associated. In such a case, context profiles 110 and 128 may include both context-based extraction data 112 and context-based transformation data 130 and may be stored separately from, but in communication with, the extraction layer 102 and the transformation layer 104.

Alternatively, in other examples, the context profiles 128 and context profiles 110 are separate, such that the context-based extraction data 112 is kept separate from the context-based transformation data 130. Such a separation may be necessary to enable two extracted data sets 124 to be associated with separate context profiles 128 and differing context-based transformation data 130, despite the two input data sets 106 with which the two extracted data sets 124 are associated respectively having been associated with the same context profile 110. For instance, if a certain type of anomalous data 114 was present in one of the input data sets but not the other and that certain type of anomalous data 114 results in a related context profile 128 being associated to one of the extracted data sets but not the other, wherein the related context profile 128 includes context-based transformation data 130 that indicates the transformation process applied to the extracted data should account for the presence of data patterns related to the anomaly, differing optimizations and/or transformation operations may be applied to the two extracted data sets 124.

In some examples, the optimizer engine 126 is configured to optimize the transformation operations and/or processes for the extracted data 124 at runtime of the transformation layer 104 (e.g., immediately before the transformation of a specific set of extracted data 124 is to begin or even during the transformation of that specific set). The transformation engine 132 may be configured to generally perform transformation operations on extracted data 124 according to a defined specification, but the optimizer engine 126 is configured to interact with the transformation engine 132 to adjust how the transformation engine 132 operates as described herein. For instance, context metadata associated with the extracted data 124, such as a quantity of data in the extracted data 124 and/or an organization, arrangement, and/or format of the extracted data 124, may be used by the optimizer engine 126 to adjust and/or otherwise change the resources used by the transformation engine 132 to perform the defined transformation operations on the extracted data (e.g., adjusting a quantity of processors assigned to process the extracted data 124 based on its organization or arrangement). Such an optimization may improve the performance of the transformation operations by decreasing the time required and/or increasing the efficiency of resource usage of the transformation layer (e.g., some types of extracted data 124 may enable greater use of processing parallelization than other types of extracted data 124).

Further, the optimizer engine 126 may be configured to adjust or otherwise change code or associated data (e.g., data queries) to improve the performance of the transformation process on the extracted data 124. For instance, an aspect of a particular set of extracted data 124 may benefit from the use of more temporary data tables during processing than is normally used according to the defined specification of the transformation engine 132. In such a case, the optimizer engine 126 may adjust the transformation process for the extracted data 124 to increase the quantity of temporary data tables used.

In another example, an extracted data set 124 may require that it be split into subsets that must be processed serially. In such an example, the optimizer engine 126 may be configured to adjust the transformation process of the extracted data set 124 to use a large server resource, which may increase the possible size of each subset and thereby reduce the quantity of subsets that must be used. In other examples, other types of adjustments may be made by the optimizer engine 126 to improve the efficiency and/or performance of the transformation engine 132. Some other examples may include optimization of the steps of a transformation process (e.g., removing a step, including a step, changing the order of steps), optimization of the time spent on a process (e.g., increasing or decreasing the rates at which processes are performed, synchronizing parallel processes), and/or optimization of the resources spent on a process (e.g., leveraging different sets of processing resources, memory resources, data storage resources, network resources, or the like based on the extracted data 124, the associated context-based transformation data 130, and/or any other related context metadata).

In some examples, the optimizer engine 126 is configured to automatically detect when optimizations can be made based on identifying patterns associated with the extracted data 124, the associated context-based transformation data 130, and/or other related context metadata. Such automatic detection may be based on rules defined by users of the system, such that defined metadata patterns are mapped to specific optimizations. For instance, a pattern may be that the extracted data 124 exceeds a defined size and the optimization may be to increase the resources assigned to the transformation processing of that extracted data 124. Other optimizations may be linked to other types of patterns such that the optimizer engine 126 can detect a variety of patterns and automatically perform an associated variety of optimizations. Alternatively, or additionally, the optimizer engine 126 may be configured to include an optimization model that is trained using machine learning techniques and user-input training data similar to the pattern-based rules described above. Such an optimization model may be configured to attempt to categorize extracted data 124 and output one or more related optimizations automatically. Such a model may be trained prior to use and it may also be improved during use through providing feedback based on its automatic optimization output (e.g., confirming that an optimization was correct and/or effective or indicating that an optimization was incorrect and/or ineffective for the extracted data 124). In some examples where an optimization model is used, it may be configured to operate in a substantially similar way as the correction model 116 or in a different way from the correction model 116 without departing from the description.

Further, optimizations made by the optimizer engine 126 may include optimizing the data flow between data tables and/or other data structures during processing in the transformation layer, such as identifying and eliminating the use of tables that are redundant and/or unnecessary. Further optimizations may include collecting additional statistics of the extracted data that may be useful in optimization, optimizing the partitioning of the data during processing, splitting up data tables based on used and unused columns by associated queries such that only the data necessary for the query is present when it is executed, aggregating data sets based on data usage (e.g., the quantity of process steps may be reduced by combining data that will be processed by a particular step to be processed at the same time), identifying and eliminating unused data tables or structures from the process, and the like.

In some examples, the transformation engine 132 is configured to perform transformation operations on the extracted data 124 based on a transformation specification. The performed transformation operations may be specific to context of the extracted data 124 and based on context-based transformation data 130 of an associated context profile 128. Such context-based transformation data 130 may include indications of transformation operations that may be used to transform the extracted data 124 to the transformed data 136 based on, for instance, data types of the extracted data 124, data structure and/or organization of the extracted data 124, or the like. As described above, the transformation operations performed by the transformation engine 132 may be adjusted and/or changed by the optimizer engine 126 prior to or even during the processing of the extracted data 124 into the transformed data 136. It should be understood that, in many examples, the transformation engine 132, and the transformation layer 104 more generally, are configured to transform the extracted data 124 into a defined machine-readable format and structure such that it can be used by other entities of the system 100 or systems related thereto. The transformed data 136 sent to the target data store 134 as output from the transformation engine 132 is configured to be in such a format and/or structure. The transformation engine 132 may be configured to receive or obtain extracted data 124 originally from a variety of different data sources, with a variety of different types and/or structures of data and transform those different extracted data into consistently formatted and/or structured transformed data 136.

The target data store 134 is configured to receive and store the transformed data 136. In some examples, the target data store 134 is a single data store, but in other examples, the target data store 134 includes multiple distributed data stores that are connected via a network. The transformed data 136 is loaded into the target data store 134 by the transformation engine 132, or the transformation layer 104 more generally, as described herein. The target data store 134 is configured to provide other entities access to the transformed data 136 (e.g., other systems or software entities that are allowed access to the data). It should be understood that the target data store 134 may operate as a database, an object data store, or other type of data store without departing from the description.

Figure 2:
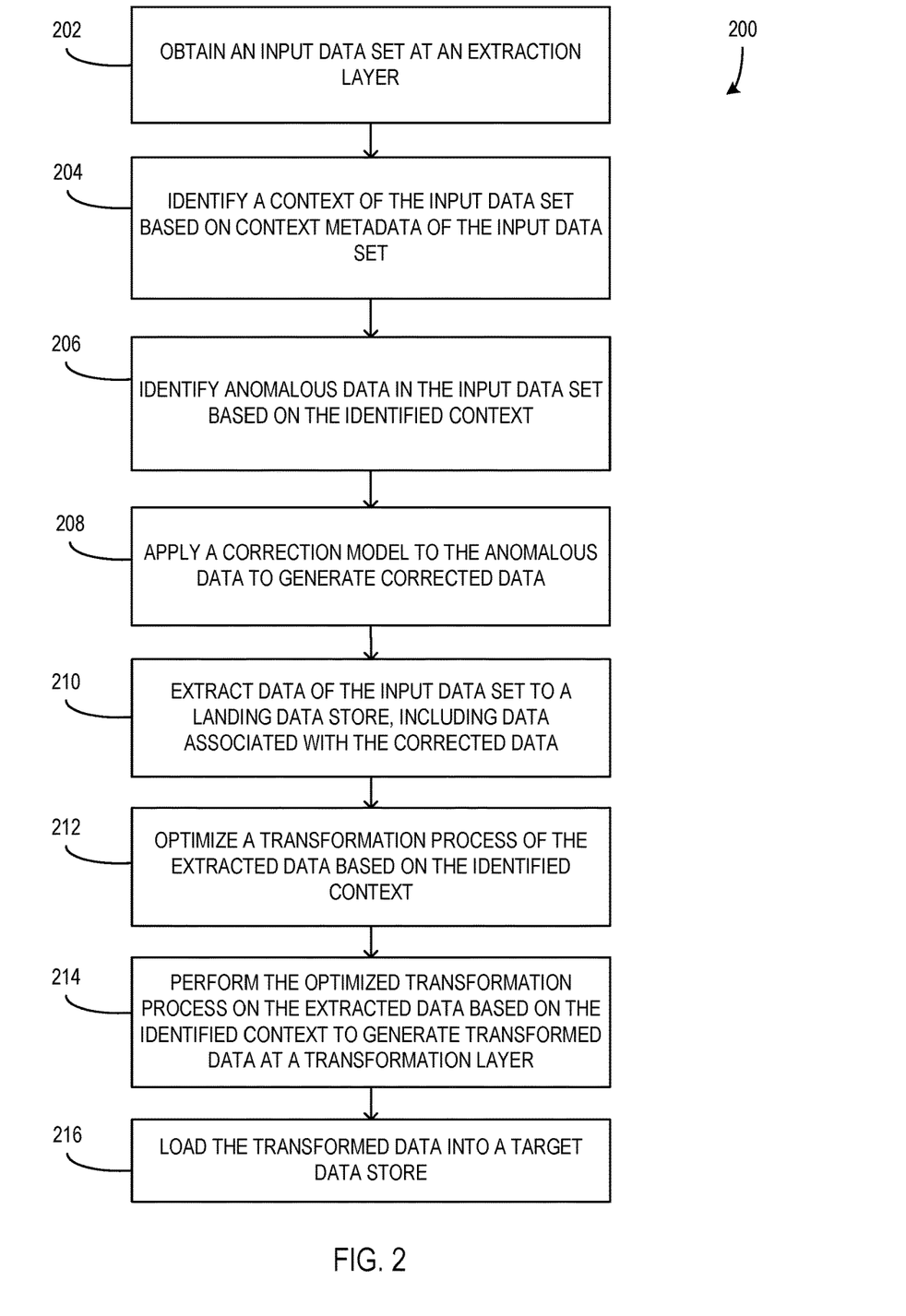
FIG. 2 is a flowchart illustrating a process of a system for processing input data according to an embodiment.

FIG. 2 is a flowchart illustrating a process 200 of a system for processing input data according to an embodiment. In some examples, the process 200 is performed by a system such as system 100 of FIG. 1 described above. At 202, an input data set is obtained at an extraction layer of the system. In some examples, the input data set is received via an input interface of the system from a data source (e.g., a customer system). Alternatively, or additionally, the system obtains the input data set from a data store containing input data sets that are ready for processing by the system (e.g., a data store that stores received input data sets in a queue or other data structure such that the system is enabled to obtain an input data set when ready to process it).

At 204, a context of the input data set is identified based on context metadata of the input data set. In some examples, identifying the context of the input data set includes identifying a context profile from a plurality of context profiles associated with the system. The context profile is identified based on the context metadata, wherein the context profile matches at least a portion of the context metadata of the input data set. For instance, the context profile may include sets or patterns of context metadata that indicate that an input data set should be associated with the context profile and, if the context metadata of the input data set matches those sets or patterns to a sufficient extent, the context profile is used to identify the context of the input data set as described herein. Matching may include, for instance, the context metadata of the input data set including 75% of the context metadata in the sets or patterns of the context profile.

In some examples, an input data set may match multiple context profiles based on the context metadata. In such examples, the system may be configured to use the context profile which the input data set matches to the greatest extent (e.g., the context metadata of the input data set matches 95% of the sets or patterns of a first context profile and 75% of the sets or patterns of a second context profile, so the first context profile is used rather than the second context profile). In other examples, the context of the input data set may be identified based on matching multiple context profiles, such that both context profiles may be associated with the input data set to represent that data set's unique context (e.g., an input data set may have a context that includes association with a context profile indicative of "transaction data" and a context profile indicative of "refunded transaction data").

At 206, anomalous data in the input data set is identified based on the identified context. In some examples, the identified context is used by the system to determine data in the input data set that is expected and data that is not expected, or anomalous, as described herein. The anomalous data in the input data set may include incorrect data types of data entries, empty data fields of data entries, extra data fields in the data set, missing data fields in the data set, or the like. Further, in some examples, the anomalous data may be identified based on patterns associated with the context profile of the input data set and/or based on the application of a correction model to the input data set as described herein.

At 208, a correction model is applied to the anomalous data to generate corrected data. In some examples, the correction model is trained using machine learning techniques and past manual data correction data as training data. The correction model may be configured to apply correction operations to anomalous data based on how the anomalous data matches previously corrected anomalous data. The corrections made by the correction model may also be evaluated for accuracy and that information may be used as additional training data to improve the correction model over time (e.g., an accurate correction operation may be used to reinforce the correction model and an inaccurate correction operation may be used to adjust the correction model such that a different operation is likely to be used in future situations that are similar).

At 210, data of the input data set is extracted to a landing data store, including data associated with the corrected data. In some examples, the extraction of the input data set to the landing data store is based on context-based extraction data, which may be associated with the context profile. For instance, the context-based extraction data may indicate that an extraction process of the input data set includes extracting a particular string data value of the input data set and a particular integer data value of the input data set to a defined data table, such that the extracted data includes a table data structure of string data values and integer data values. Such an extraction process may not apply to input data sets generally, as many input data sets may not include those string data values and/or those integer data values.

At 212, a transformation process of the extracted data is optimized based on the identified context. In some examples, the transformation process is optimized based on the context profile of the input data set, including context-based transformation data. Further, the transformation process may be optimized prior to the performance of the transformation process and/or during the run time of the transformation process (e.g., performance of one step of the transformation process may result in a potential optimization of a later step of the transformation process). Optimizations of the transformation process may include adjusting resources used during the transformation process, such as processing resources, memory resources, data storage resources, network resources, and the like. Additionally, or alternatively, optimizations of the transformation process may include adjusting the process operations of the transformation process, such as adding a new process operation, removing a process operation, reordering process operations, combining process operations into batch operations, changing a process operation, and the like.

At 214, the optimized transformation process is performed on the extracted data to generate transformed data at a transformation layer of the system. In some examples, the transformation process is further optimized during the process, as described above. Further, the transformation process may be performed on the extracted data based on context-based transformation data, such as data indicating that several data values of the input data set should be combined into a particular data structure in the transformed data. It should be understood that the transformation process applied to the extracted data may include more, fewer, or different transformation operations without departing from the description. At 216, the transformed data is loaded into a target data store.

Figure 3:
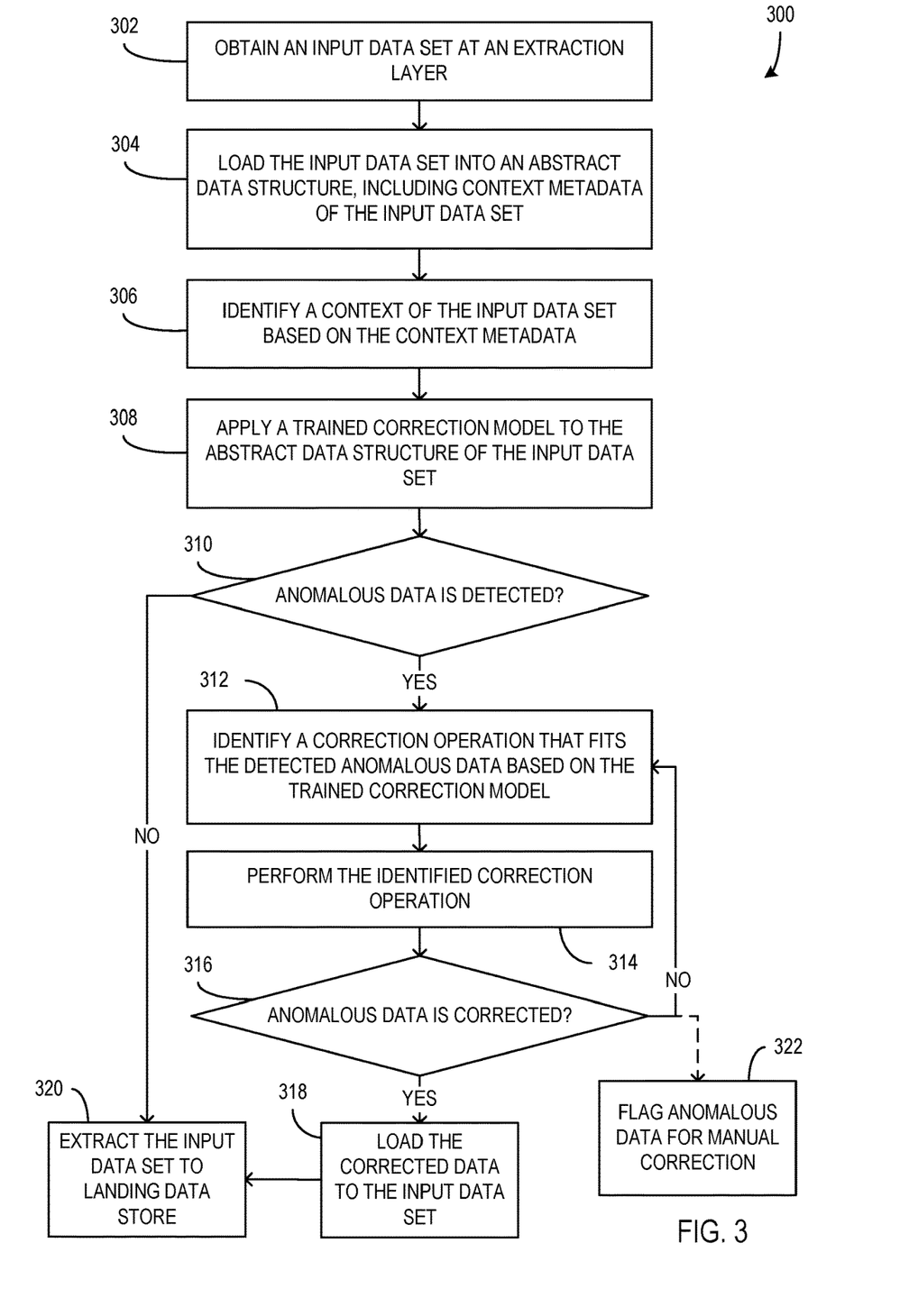
FIG. 3 is a flowchart illustrating a process of a system for correcting anomalous data during an extraction process according to an embodiment.

FIG. 3 is a flowchart illustrating a process 300 of a system for correcting anomalous data during an extraction process according to an embodiment. In some examples, the process 300 is performed by a system such as system 100 of FIG. 1 described above. At 302, an input data set is obtained at an extraction layer and, at 304, the input data set is loaded into an abstract data structure, including context metadata of the input data set. For instance, the transfer of the data of the input data set into the abstract data structure may include eliminating unnecessary data structure complexity or data structures that would inhibit the operation of the system.

At 306, a context of the input data set is identified based on the context metadata. In some examples, the context of the input data structure is identified as described herein with respect to FIGS. 1 and 2 above. At 308, a trained correction model is applied to the abstract data structure of the input data set. In some examples, the trained correction model operates as correction model 116 of FIG. 1 as described above. At 310, if anomalous data is detected by the trained correction model, the process proceeds to 312. Alternatively, if anomalous data is not detected by the trained correction model, the process proceeds to 320. It should be understood that, in some examples, the trained correction model may perform anomalous data detection on the input data set multiple times (e.g., to identify multiple different types of anomalies) prior to proceeding to 320, such that, upon not detecting a first type of anomalous data in the input data set, the trained correction model may attempt to detect a second type of anomalous data. Other different methods of detecting anomalous data may also be performed by the trained correction model without departing from the description.

At 312, the trained correction model identifies a correction operation that fits the detected anomalous data. Identifying a correction operation that "fits" may include using the trained correction model to classify the detected anomalous data as a particular type and then identifying a correction operation associated with that type. Other methods of using the model to identify a correction operation may be used without departing from the description.

At 314, the identified correction operation is performed on the anomalous data and, at 316, if the anomalous data is corrected, the process proceeds to 318. Alternatively, if the anomalous data is not corrected, the process returns to 312 to identify another correction operation to try. The evaluation of whether the anomalous data is corrected may include comparing the data to expected corrected data type or format and/or evaluating whether the performance of the identified correction operation was completed (e.g., if the correction operation failed or errored out, the anomalous data was probably not corrected). Multiple correction operations may be tried using the trained correction model, but if none are found to correct the anomalous data, in some examples, the anomalous data may be flagged for manual correction at 322. In such examples, those anomalous data may later be addressed by a user of the system and the correction operations chosen by the suer for those manually corrected data may be used as training data to improve the trained correction model using machine learning techniques.

At 318, the corrected data are loaded into the input data set. In some examples, those corrected data replace the anomalous data in the input data set. For anomalous data that affects data other than data entries in the data set (e.g., a misspelled data field name), the anomalous data may be altered to reflect the corrected data (e.g., editing the data field name to correct the spelling). After all the anomalous data has been corrected or flagged for manual correction, the input data set is extracted to form extracted data, which is sent to the landing data store at 320.

Figure 4:
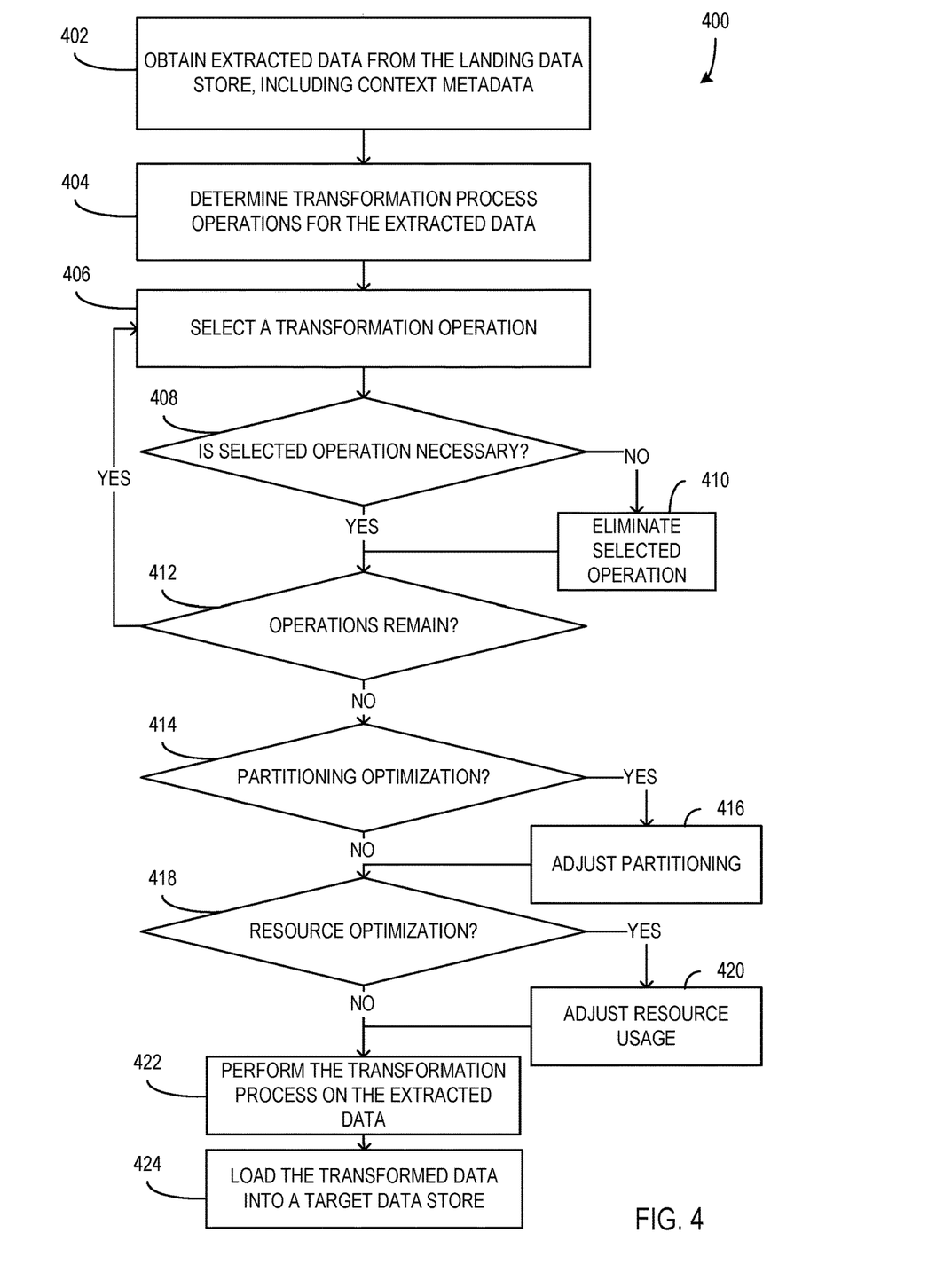
FIG. 4 is a flowchart illustrating a process of a system for optimizing a transformation process according to an embodiment.

FIG. 4 is a flowchart illustrating a process 400 of a system for optimizing a transformation process according to an embodiment. In some examples, the process 400 is performed by a data processing system such as system 100 of FIG. 1 described above. At 402, extracted data is obtained from the landing data store, including context metadata and, at 404, transformation process operations are determined for the extracted data. In some examples, determination of the operations is based on the context metadata (e.g., using context-based transformation data 130) as described herein. At 406, a transformation operation of the determined transformation process operations is selected and, at 408, it is determined whether the selected operation is necessary. If the selected operation is determined to be necessary, the process proceeds to 412. Alternatively, if the selected operation is determined to be unnecessary, the process proceeds to 410, where the selected operation is eliminated from the set of transformation operations to be performed on the extracted data. In some examples, an optimizer engine determines an operation is unnecessary if the operation is found to be redundant or if the operation is found to operate on data in such a way that the output of the transformation process is unaffected by the operation. Aspects of context of the different sets of extracted data may render different operations in a default set of transformation operation unnecessary, such that the optimizer engine eliminates different operations depending on those aspects of context.

At 412, if transformation operations remain to be evaluated, the process returns to 406 to select another transformation operation. Alternatively, the process proceeds to 414.

At 414, if data partitioning in the transformation process can be optimized, the process proceeds to 416. If no partitioning optimization is possible, the process proceeds to 418. At 416, the partitioning of the data to which the transformation process operations are applied is adjusted to optimize the process. Such optimizations may include partitioning or grouping data such that only data needed for a particular operation is present in a temporary data table upon which the operation will operate. Such an optimization may improve the performance of that operation by eliminating the presence of unused data which may slow down the operation of a related data query or the like. Other types of partitioning adjustments may be made to optimize the transformation process without departing from the description (e.g., if a full table scan is necessary for several data query operations, the data may be partitioned such that a single full table scan can be used for multiple query operations). After adjusting the partitioning at 416, the process proceeds to 418.

At 418, if resource usage of the transformation process can be optimized, the process proceeds to 420. Alternatively, if no resource usage optimization is possible, the process proceeds to 422. At 420, the resource usage of the transformation process is adjusted to optimize the transformation process (e.g., reduce the time taken to perform the transformation process, reduce the quantity of resources used by the transformation process, enhance the efficiency of resource usage). In some examples, adjusting resource usage may include expanding the amount of storage resources of a transformation process to increase the quantity temporary data tables used, increasing the quantity of processing resources of a transformation process to enable parallel performance of transformation operations, or the like. When the resource usage adjustment is complete, the process proceeds to 422.

At 422, the optimized transformation process is performed on the extracted data. The optimized transformation process may include optimizations of eliminated unnecessary operations, adjusted data partitioning, and/or adjusted resource usage. In other examples, more, fewer, or different types of optimizations may be applied to the transformation process without departing from the description. At 424, the transformed data is loaded into the target data store.

In other examples, the optimization of transformation operations, partitioning, and resource usage may be performed in different orders or arrangements without departing from the description.

In some examples, the determination of transformation process operations to perform on the data includes determining scripts to be performed on portions or all of the extracted data based on the context metadata of the extracted data. The context metadata may be used, in combination with associated context profiles and context-based transformation data, to generate target table(s) and/or transformation logic. For instance, United State Patent Application No. <insert #> describes generation of data processing code based on input in a predefined format. The disclosure described herein may be used to automatically generate the input in the predefined format based on context metadata of the data to be transformed. The input in a predefined format may include requirements of the target table and/or transformation logic. Such requirements and transformation logic may include data definition logic (DDL), ETL specifications, encryption requirements, load strategies, data sourcing, and/or other data processing methodologies. The input may further include scripts or script portions which indicate transformation rules per column of data in a table, along with any data processing requirements such as late arriving dimensions, surrogate key generation, or the like. Further, in such examples, determined scripts may be used to generate temporary data tables, populate those temporary data tables, join data tables, or otherwise perform operations on data tables. Further scripts may be used to further process data in temporary data tables into other temporary data tables or into final data tables or other data forms. The disclosure described herein may, as part of the determination of transformation process operations, generate such logic and/or scripts as input for a system such as the system described in United States Patent Application No. <insert #>.

Exemplary Operating Environment

Figure 5:
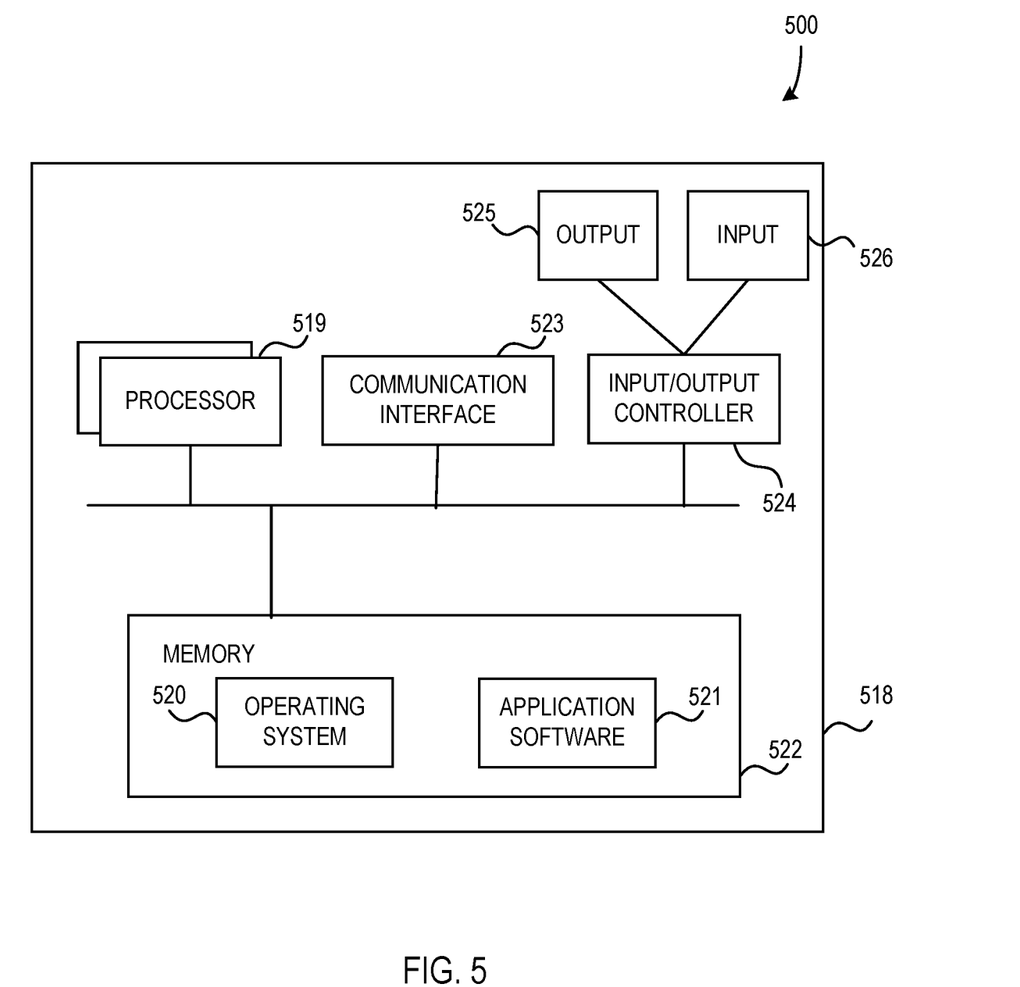
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers, or any other suitable type of processors for processing computer executable instructions to control the operation of the electronic device. Alternatively, or in addition, the processor 519 is any technology capable of executing logic or instructions, such as a hard-coded machine. Platform software comprising an operating system 520 or any other suitable platform software may be provided on the apparatus 518 to enable application software 521 to be executed on the device. According to an embodiment, processing data using a self-configuring system as described herein may be accomplished by software, hardware, and/or firmware.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g., using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone, or a touchpad. In one embodiment, the output device 525 may also act as the input device. An example of such a device may be a touch sensitive display. The input/output controller 524 may also output data to devices other than the output device, e.g., a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system for orchestrating data processing in a system comprises: a processor of the system; and a non-transitory computer readable medium having stored thereon program code for transferring data to another computer system, the program code causing the processor to: obtain an input data set at an extraction layer; identify a context of the input data set based on context metadata of the input data set; identify anomalous data in the input data set based on the identified context; apply a correction model to the anomalous data, wherein the correction model is configured to perform a correction operation on the anomalous data based on the identified context to generate corrected data; extract data of the input data set to a landing data store, wherein the extracted data includes data associated with the corrected data; optimize a transformation process of the extracted data based on the identified context; perform, at a transformation layer, the optimized transformation process on the extracted data based on the identified context to generate transformed data; and load the transformed data into a target data store.

An example computerized method for orchestrating data processing in a system comprises: obtaining, by a processor of the system, an input data set at an extraction layer; identifying, by the processor, a context of the input data set based on context metadata of the input data set; identifying, by the processor, anomalous data in the input data set based on the identified context; applying, by the processor, a correction model to the anomalous data, wherein the correction model is configured to perform a correction operation on the anomalous data based on the identified context to generate corrected data; extracting, by the processor, data of the input data set to a landing data store, wherein the extracted data includes data associated with the corrected data; optimizing, by the processor, a transformation process of the extracted data based on the identified context; performing, by the processor, at a transformation layer, the optimized transformation process on the extracted data based on the identified context to generate transformed data; and loading, by the processor, the transformed data into a target data store.

A non-transitory computer storage medium having stored thereon program code executable by a first computer system at a first site, the program code embodying a method that comprises: obtaining, by a system, an input data set at an extraction layer; identifying a context of the input data set based on context metadata of the input data set; identifying anomalous data in the input data set based on the identified context; applying a correction model to the anomalous data, wherein the correction model is configured to perform a correction operation on the anomalous data based on the identified context to generate corrected data; extracting data of the input data set to a landing data store, wherein the extracted data includes data associated with the corrected data; optimizing a transformation process of the extracted data based on the identified context; performing, at a transformation layer, the optimized transformation process on the extracted data based on the identified context to generate transformed data; and loading the transformed data into a target data store.

Alternatively, or in addition to the other examples described herein, examples include any combination of the following:

wherein identifying the context of the input data set based on context metadata includes: identifying a context profile from a plurality of context profiles based on the context metadata of the input data set, wherein the identified context profile matches at least a portion of the context metadata of the input data set; and wherein extracting data of the input data set to the landing data store is based on context-based extraction data of the identified context profile.

further comprising: obtaining correction feedback data associated with past performed correction operations by the correction model, wherein the obtained correction feedback data includes indications of accuracy of the past performed correction operations; and training the correction model using the obtained correction feedback data based on at least one machine learning technique.

wherein the identified anomalous data in the input data set includes at least one of the following: incorrect data type of a data entry, an empty data field of a data entry, an extra data field in the data set, and a missing data field in the data set.

wherein optimizing the transformation process of the extracted data based on the identified context includes adjusting resources used to perform the transformation process based on the identified context, wherein the resources used include at least one of the following: processing resources, memory resources, data storage resources, and network resources.

wherein optimizing the transformation process of the extracted data based on the identified context includes adjusting process operations of the transformation process based on the identified context, wherein adjusting process operations includes at least one of the following: adding a new process operation to the transformation process, removing a process operation from the transformation process, reordering process operations in the transformation process, combining process operations into a batch operation of the transformation process, and changing a process operation of the transformation process.

wherein optimizing the transformation process based on the identified context includes optimizing the transformation process during runtime of the performance of the transformation process.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means for obtaining, by a processor of the system, an input data set at an extraction layer; exemplary means for identifying, by the processor, a context of the input data set based on context metadata of the input data set; exemplary means for identifying, by the processor, anomalous data in the input data set based on the identified context; exemplary means for applying, by the processor, a correction model to the anomalous data, wherein the correction model is configured to perform a correction operation on the anomalous data based on the identified context to generate corrected data; exemplary means for extracting, by the processor, data of the input data set to a landing data store, wherein the extracted data includes data associated with the corrected data; exemplary means for optimizing, by the processor, a transformation process of the extracted data based on the identified context; exemplary means for performing, by the processor, at a transformation layer, the optimized transformation process on the extracted data based on the identified context to generate transformed data; and exemplary means for loading, by the processor, the transformed data into a target data store.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method for orchestrating data processing in a system, the computerized method comprising:
    obtaining, by a processor of the system, an input data set at an extraction layer;
    identifying, by the processor, context metadata of the input data set, wherein the context metadata of the input data set specifies at least one file name and at least one data type associated with the input data set;
    identifying, by the processor, anomalous data in the input data set based on the context metadata of the input data set;
    applying, by the processor, a trained correction model to the anomalous data, wherein the trained correction model is configured to perform a correction operation on the anomalous data based on the context metadata of the input data set to generate corrected data, and wherein the trained correction model is trained, based on at least one machine learning technique, using past correction feedback data from past performed correction operations, and wherein generating the corrected data comprises applying the trained correction model to:
        classify the anomalous data as a particular anomalous type based on the context metadata of the input data set,
        identify a correction operation associated with the classified anomalous type based on the past correction feedback data, and
        generate the corrected data by performing the identified correction operation;
    extracting, by the processor, data of the input data set to a landing data store, wherein the extracted data includes data associated with the corrected data;
    optimizing, by the processor, a transformation process of the extracted data based on the context metadata of the input data set;
    performing, by the processor, at a transformation layer, the optimized transformation process on the extracted data based on the context metadata of the input data set to generate transformed data; and
    loading, by the processor, the transformed data into a target data store.

2. The computerized method of claim 1, further comprising:
    obtaining the past correction feedback data from the past performed correction operations by the trained correction model, wherein the obtained past correction feedback data includes indications of accuracy of the past performed correction operations.

3. The computerized method of claim 1, wherein:
    the identified anomalous data in the input data set includes at least one of the following:

incorrect data type of a data entry, an empty data field of a data entry, an extra data field in the data set, and a missing data field in the data set, and the particular anomalous type includes a string type of data where an integer type of data is expected, an unexpected metadata value, an incorrect type of data, a data value outside an expected range, and an anomalous file type.

4. The computerized method of claim 1, wherein optimizing the transformation process of the extracted data based on the context metadata of the input data set includes adjusting resources used to perform the transformation process based on the context metadata of the input data set, wherein the resources used include at least one of the following: processing resources, memory resources, data storage resources, and network resources.

5. The computerized method of claim 1, wherein optimizing the transformation process of the extracted data based on the context metadata of the input data set includes adjusting process operations of the transformation process based on the context metadata of the input data set, wherein adjusting process operations includes at least one of the following: adding a new process operation to the transformation process, removing a process operation from the transformation process, reordering process operations in the transformation process, combining process operations into a batch operation of the transformation process, and changing a process operation of the transformation process.

6. The computerized method of claim 1, wherein optimizing the transformation process based on the context metadata of the input data set includes optimizing the transformation process during runtime of the performance of the transformation process.

7. The computerized method of claim 1, wherein classifying the anomalous data as a particular anomalous type comprises classifying the anomalous data as a particular anomalous type based on the past correction feedback data.

8. The computerized method of claim 1, wherein the context metadata of the input data set further specifies labels associated with columns or fields within the input data.

9. The computerized method of claim 1, wherein the context metadata of the input data set further specifies quantit(ies) of columns or fields within the input data.

10. The computerized method of claim 1, wherein the context metadata of the input data set further specifies classification(s) associated with the input data.

11. The computerized method of claim 10, wherein the context metadata of the input data set further specifies limitations on the classification(s) associated with the input data.

12. The computerized method of claim 1, wherein the context metadata of the input data set further specifies relationships between data entries in the input data.

13. The computerized method of claim 1, wherein the context metadata of the input data set further specifies parent-child relationships between data entries in the input data.

14. A computer system for orchestrating data processing in a system, the computer system comprising:
a processor; and
a non-transitory computer readable medium having stored thereon program code for transferring data to another computer system, the program code, when executed by the processor, causing the processor to:
obtain an input data set at an extraction layer;
identify context metadata of the input data set, wherein the context metadata of the input data set specifies at least one file name and at least one data type associated with the input data set;
identify anomalous data in the input data set based on the context metadata of the input data set;
apply a trained correction model to the anomalous data, wherein the trained correction model is configured to perform a correction operation on the anomalous data based on the context metadata of the input data set to generate corrected data, and wherein the trained correction model is trained, based on at least one machine learning technique, using past correction feedback data from past performed correction operations, and wherein generating the corrected data comprises applying the trained correction model to:
classify the anomalous data as a particular anomalous type based on the context metadata of the input data set,
identify a correction operation associated with the classified anomalous type based on the past correction feedback data, and
generate the corrected data by performing the identified correction operation;
extract data of the input data set to a landing data store, wherein the extracted data includes data associated with the corrected data;
optimize a transformation process of the extracted data based on the context metadata of the input data set;
perform, at a transformation layer, the optimized transformation process on the extracted data based on the context metadata of the input data set to generate transformed data; and
load the transformed data into a target data store.

15. The computer system of claim 14, the program code further causing the processor to:
obtain the past correction feedback data from the past performed correction operations by the trained correction model, wherein the obtained past correction feedback data includes indications of accuracy of the past performed correction operations.

16. The computer system of claim 14, wherein the identified anomalous data in the input data set includes at least one of the following: incorrect data type of a data entry, an empty data field of a data entry, an extra data field in the data set, and a missing data field in the data set.

17. The computer system of claim 14, wherein optimizing the transformation process of the extracted data based on the context metadata of the input data set includes adjusting resources used to perform the transformation process based on the context metadata of the input data set, wherein the resources used include at least one of the following: processing resources, memory resources, data storage resources, and network resources.

18. The computer system of claim 14, wherein optimizing the transformation process of the extracted data based on the context metadata of the input data set includes adjusting process operations of the transformation process based on the context metadata of the input data set, wherein adjusting process operations includes at least one of the following: adding a new process operation to the transformation process, removing a process operation from the transformation process, reordering process operations in the transformation process, combining process operations into a batch operation of the transformation process, and changing a process operation of the transformation process.

19. The computer system of claim 14, wherein optimizing the transformation process based on the context metadata of the input data set includes optimizing the transformation process during runtime of the performance of the transformation process.

20. A non-transitory computer storage medium having stored thereon program code executable by a first computer system at a first site, the program code embodying a method comprising:
  obtaining, by a data processing system, an input data set at an extraction layer;
  identifying context metadata of the input data set, wherein the context metadata of the input data set specifies at least one file name and at least one data type associated with the input data set;
  identifying anomalous data in the input data set based on the context metadata of the input data set;
  applying a trained correction model to the anomalous data, wherein the trained correction model is configured to perform a correction operation on the anomalous data based on the context metadata of the input data set to generate corrected data, and wherein the trained correction model is trained, based on at least one machine learning technique, using past correction feedback data from past performed correction operations, and wherein generating the corrected data comprises applying the trained correction model to:
    classify the anomalous data as a particular anomalous type based on the context metadata of the input data set,
    identify a correction operation associated with the classified anomalous type based on the past correction feedback data, and
    generate the corrected data by performing the identified correction operation;
  extracting data of the input data set to a landing data store, wherein the extracted data includes data associated with the corrected data;
  optimizing a transformation process of the extracted data based on the context metadata of the input data set;
  performing, at a transformation layer, the optimized transformation process on the extracted data based on the context metadata of the input data set to generate transformed data; and
  loading the transformed data into a target data store.

* * * * *